US009076493B2

(12) United States Patent
Lou et al.

(10) Patent No.: US 9,076,493 B2
(45) Date of Patent: Jul. 7, 2015

(54) VIDEO PROCESSING METHOD APPARATUS

(71) Applicant: HUAWEI TECHNOLOGIES CO., LTD., Shenzhen (CN)

(72) Inventors: Shuai Lou, Beijing (CN); Qian Chen, Beijing (CN)

(73) Assignee: HUAWEI TECHNOLOGIES CO., LTD., Shenzhen, P.R. (CN)

( * ) Notice: Subject to any disclaimer, the term of this patent is extended or adjusted under 35 U.S.C. 154(b) by 73 days.

(21) Appl. No.: 14/109,096

(22) Filed: Dec. 17, 2013

(65) Prior Publication Data

US 2014/0105576 A1  Apr. 17, 2014

Related U.S. Application Data

(63) Continuation of application No. PCT/CN2011/083003, filed on Nov. 26, 2011.

(51) Int. Cl.
| | |
|---|---|
| H04N 9/80 | (2006.01) |
| H04N 5/93 | (2006.01) |
| G11B 27/19 | (2006.01) |
| H04N 21/43 | (2011.01) |
| H04N 21/472 | (2011.01) |
| H04N 21/6371 | (2011.01) |

(52) U.S. Cl.
CPC ............ *G11B 27/19* (2013.01); *H04N 21/4302* (2013.01); *H04N 21/47217* (2013.01); *H04N 21/6371* (2013.01)

(58) Field of Classification Search
CPC ............... G11B 27/19; H04N 21/4302; H04N 21/47217; H04N 21/6371
USPC .......... 386/241, 353, 239, 354, 355, 356, 343
See application file for complete search history.

(56) References Cited

U.S. PATENT DOCUMENTS

| | | | |
|---|---|---|---|
| 5,377,051 A | * 12/1994 | Lane et al. | 386/314 |
| 7,096,427 B2 | 8/2006 | Van De Streek et al. | 715/719 |
| 2002/0163532 A1 | * 11/2002 | Thomas et al. | 345/723 |

FOREIGN PATENT DOCUMENTS

| | | |
|---|---|---|
| CN | 1461484 A | 12/2003 |
| CN | 101415069 A | 4/2009 |
| CN | 101980533 A | 2/2011 |

OTHER PUBLICATIONS

International Search Report issued Sep. 13, 2012, in corresponding International Patent Application No. PCT/CN2011/083003.
International Search Report mailed Sep. 13, 2012 in corresponding International Application No. PCT/CN2011/083003.

* cited by examiner

*Primary Examiner* — Robert Chevalier
(74) *Attorney, Agent, or Firm* — Staas & Halsey LLP

(57) ABSTRACT

Embodiments of the present invention provide a video processing method, including: parsing, by a buffer server, a video file, and creating a video index file, where the index file includes a position of a key frame in the video file; receiving information about a target position of video dragging and sent by a client; determining a key frame closest to the target position according to the index file and the target position; and sending video file data that begins with a position of the closest key frame to the client so that the client starts playing from the target position. Correspondingly, the embodiments of the present invention further provide a buffer server, which solves the problem that a video without a file header and a video dragged beyond a storage range of a server cannot be played after being dragged, and improves user experience.

10 Claims, 4 Drawing Sheets

VIDEO PROCESSING METHOD APPARATUS

CROSS-REFERENCE TO RELATED APPLICATION

This application is a continuation of International Application No. PCT/CN2011/083003, filed on Nov. 26, 2011, which is hereby incorporated by reference in its entirety.

TECHNICAL FIELD

Embodiments of the present invention relate to the field of communications technologies, and in particular, to a video processing method and apparatus.

BACKGROUND

Video files primarily come in two types: with a file header, and without a file header. The file header records global information of the video file, for example, size and duration of each frame, position of a key frame, and so on. A video file without a file header is composed of many video file packages. Although there is no dedicated header for storing the global information of the file, information such as the position of the key frame and a timestamp is stored in specific video file packages.

Video dragging is a common operation performed when a user watches a video. In the process of watching the video, the user can drag a progress bar to locate the current playing position of the video quickly so as to find a segment of interest quickly. Because a client has to start decoding and playing from the position of the key frame of the video, a player needs to locate the key frame of the video in the process of dragging the video.

In the prior art, the video dragging operation depends on the file header of the video file. By parsing the file header, the position information of all key frames of the video file stored in the file header is obtained, and video data that begins with a key frame is sent to the client, where the key frame is the closest to a position from which the video is requested to be dragged, and the client decodes and plays the video data, thereby completing the video dragging operation. However, if the video file of a specific format has no file header, the video file cannot be played after being dragged, so the video file can only be played sequentially.

In addition, in the prior art, a server generally uses a fragmented buffer architecture for storing video files. Under this architecture, for a video, the server only stores a part of segments of the video. In the process of dragging the video, if a target position of dragging goes beyond the range of the video segments stored on the server, the dragging operation cannot be completed, which deteriorates user experience.

SUMMARY

Embodiments of the present invention provide a video processing method and apparatus to solve a problem that a video without a file header and a video dragged beyond a storage range of a server cannot be played after being dragged.

An embodiment of the present invention provides a video processing method, including:

parsing, by a buffer server, a video file, and creating a video index file, where the index file includes a position of a key frame in the video file;

updating the index file according to information about a target position of video dragging and received from a client;

determining a key frame closest to the target position according to the updated index file; and sending video file data that begins with a position of the closest key frame to the client so that the client starts playing from the target position.

An embodiment of the present invention further provides a buffer server, including:

a creating unit, configured to parse a video file, and create a video index file, where the index file includes a position of a key frame in the video file;

an updating unit, configured to: according to information about a target position of video dragging and sent by a client, update the index file created by the creating unit;

a determining unit, configured to determine a key frame closest to the target position according to the index file updated by the updating unit; and a sending unit, configured to send video file data that begins with a position of the closest key frame to the client so that the client starts playing from the target position.

By using the method and the apparatus provided in the embodiments of the present invention, a buffer server creates and dynamically updates a video index file, selects a key frame closest to a target position of dragging, and sends video file data that begins with a position of the key frame to a client to complete a play operation after the dragging, which solves the problem that a video without a file header and a video dragged beyond a storage range of a server cannot be played after being dragged, and improves user experience.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

For better understanding of the implementation process of the present invention, the following describes an application scenario of the embodiments of the present invention first, that is, a basic architecture for implementing video processing. The architecture includes:

a source server: a core server located in a backbone network, which stores plenty of video files and sends a video file list and video file data to a buffer server;

a buffer server, also referred to as an edge server, which is located near a user and can relieve the load of the source server, reduce bandwidth occupation of the backbone network, and speed up response to the user, where the buffer server stores the video file list and the video file data that are sent by the source server, splits the video file data into fragments of a fixed size, and at the same time sends, in response to a requirement of a client, the video file list and a video file specified by the client to the client; and a client, which selects a corresponding video from the video file list, and sends a video request to the buffer server; and, after sending the request, receives the video file data sent by the buffer server, and decodes and plays the video file data; and, in addition, may drag the video file and send information about a target position of dragging to the buffer server in order for the buffer server to process the video dragging and return the processed video file data, so as to implement a play operation after the dragging.

Embodiment 1 of the Present Invention

Figure 1:
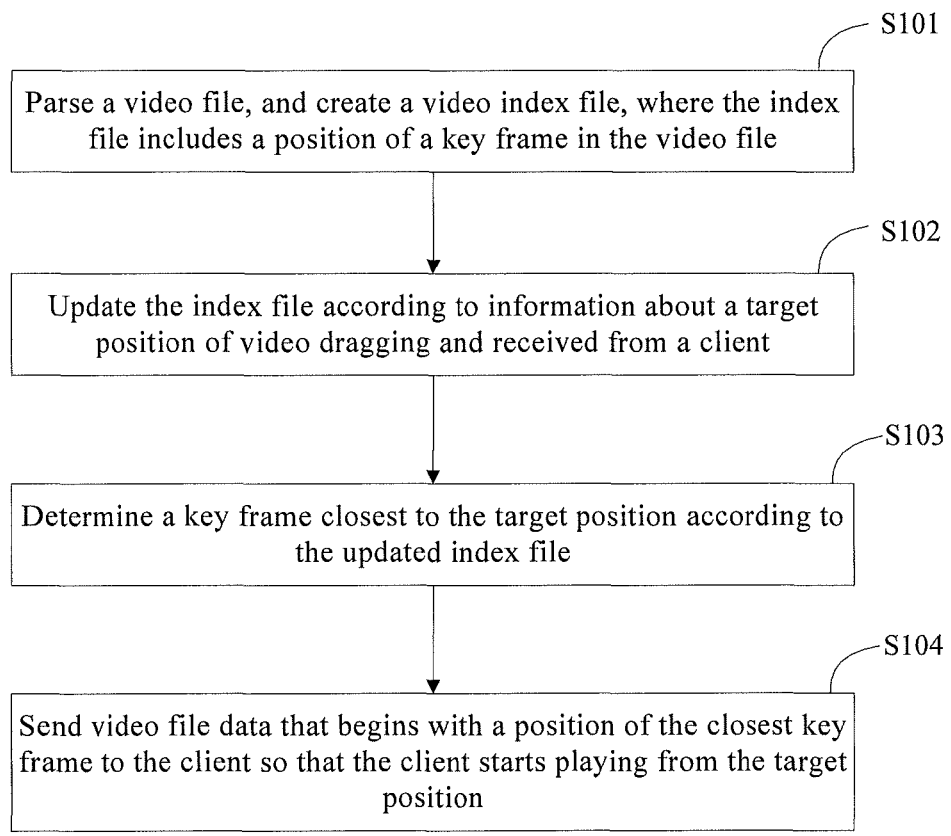
FIG. 1 is a flowchart of a method according to Embodiment 1 of the present invention.

FIG. 1 is a flowchart of a method according to Embodiment 1 of the present invention. The method includes the following steps:

S101. A buffer server parses a video file, and creates a video index file, where the index file includes a position of a key frame in the video file.

The buffer server parses the locally stored video file in the following way:

traversing the video file once to obtain a position of a key frame in a specific file data packet, creating a video index file, and writing information about the position of the key frame into the video index file.

Here, the position of the key frame may be a byte offset of the key frame, or a time offset of the key frame.

S102. The buffer server updates the index file according to information about a target position of video dragging and received from a client.

The buffer server detects that the target position goes beyond the range of the locally stored video segment, that is, the target position is not found in the locally stored video file. Therefore, the buffer server sends a video file continuing request to a source server, where the request carries information about the position of a last key frame before the target position of dragging.

It should be noted that differences may be calculated between the position of each key frame before the target position in the index file and the target position, and a key frame with the least difference is obtained and used as the information about the position of the last key frame before the target position. After the key frame is obtained, the information about the position of the key frame is encapsulated into the video file continuing request.

After receiving the request, the source server sends a continued video file to the buffer server, where the start position of the continued video file is the position information of the last key frame before the target position of dragging.

The buffer server traverses the received continued video file to obtain a position of a new key frame, and writes the position of the new key frame into the video index file to update the video index file dynamically.

S103. The buffer server determines a key frame closest to the target position according to the updated index file.

The buffer server calculates differences between the position of each key frame in the updated index file and the target position of video dragging, and determines a key frame with the least absolute value of the difference, where the position of the key frame may be before the target position or after the target position.

S104. The buffer server sends video file data that begins with a position of the closest key frame to the client so that the client starts playing from the target position.

After receiving the video file data, the client starts decoding from the position of the key frame, and locates the target position of dragging to start playing.

In this embodiment, a buffer server parses a video file, creates and updates an index file, and sends video data that begins with a key frame closest to a target position to a client so that the client completes a play operation after the video is dragged, which solves the problem that a video without a file header and a video dragged beyond a storage range of a server cannot be played after being dragged, and improves user experience.

Embodiment 2 of the Present Invention

Figure 2:
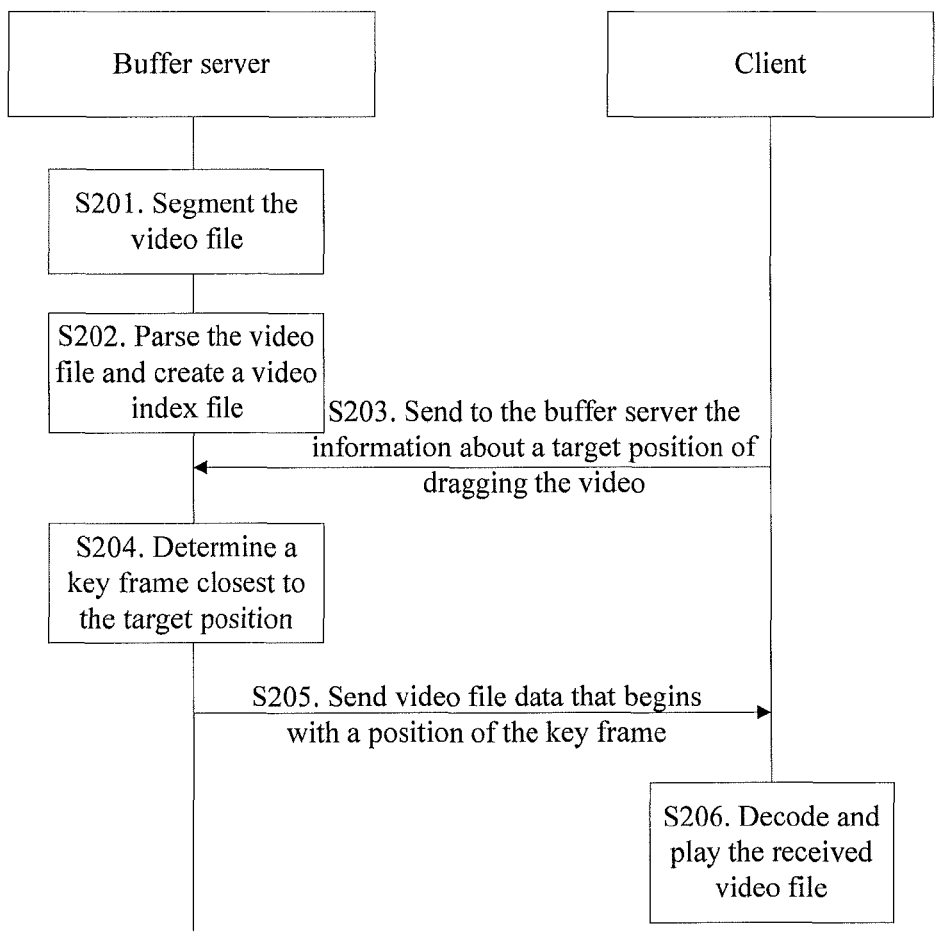
FIG. 2 is a flowchart of a method according to Embodiment 2 of the present invention.

As shown in FIG. 2, a buffer server processes video dragging in the following procedure:

S201. A buffer server performs segmentation for a video file sent by a source server.

The buffer server receives the video file sent by the source server, and divides the video file into segments of a fixed size or segments of an equal time length, which is not limited in the embodiment of the present invention.

S202. The buffer server parses the video file and creates a video index file.

After segmenting the buffered video file, the buffer server parses the segmented video file and creates a video index file in the following way:

traversing each video segment, where, because the key frame information is included in a specific video file package, the positions of all key frames in the entire buffered video file can be obtained by traversing the video file once; and creating the video index file and writing the position of the key frame in the video file into the video index file. It should be noted that the position of the key frame may be a time offset of the key frame, or a byte offset of the key frame.

S203. A client sends to the buffer server information about a target position of video dragging.

It should be noted that the target position here may be a time offset or a byte offset, and is recorded in the same manner as the position of the key frame in the video index file, where the target position of dragging does not go beyond the video range stored in the buffer server.

S204. The buffer server determines a key frame closest to the target position.

The buffer server calculates differences between the received target position and the position of each key frame recorded in the index file, and determines a key frame with the least absolute value of the difference. If two key frames have the same absolute value of the difference, either of them may be applied. The determined key frame may be before the target position or after the target position.

S205. The buffer server sends video file data that begins with a position of the closest key frame to the client.

The buffer server obtains all locally stored video segments that begin with the closest key frame, and sends the video segments to the client.

S206. The client decodes and plays the received video file.

After receiving the video file data, the client starts decoding and starts playing from the target position of dragging.

In this embodiment, a buffer server creates a video index file and records a position of a key frame, compares the position of the key frame with a target position of video dragging to determine a key frame closest to the target position, and sends video file data that begins with the position of the key frame to a client, thereby solving the problem that a video file without a file header cannot be played after being dragged, and improving user experience.

Embodiment 3 of the Present Invention

Figure 3:
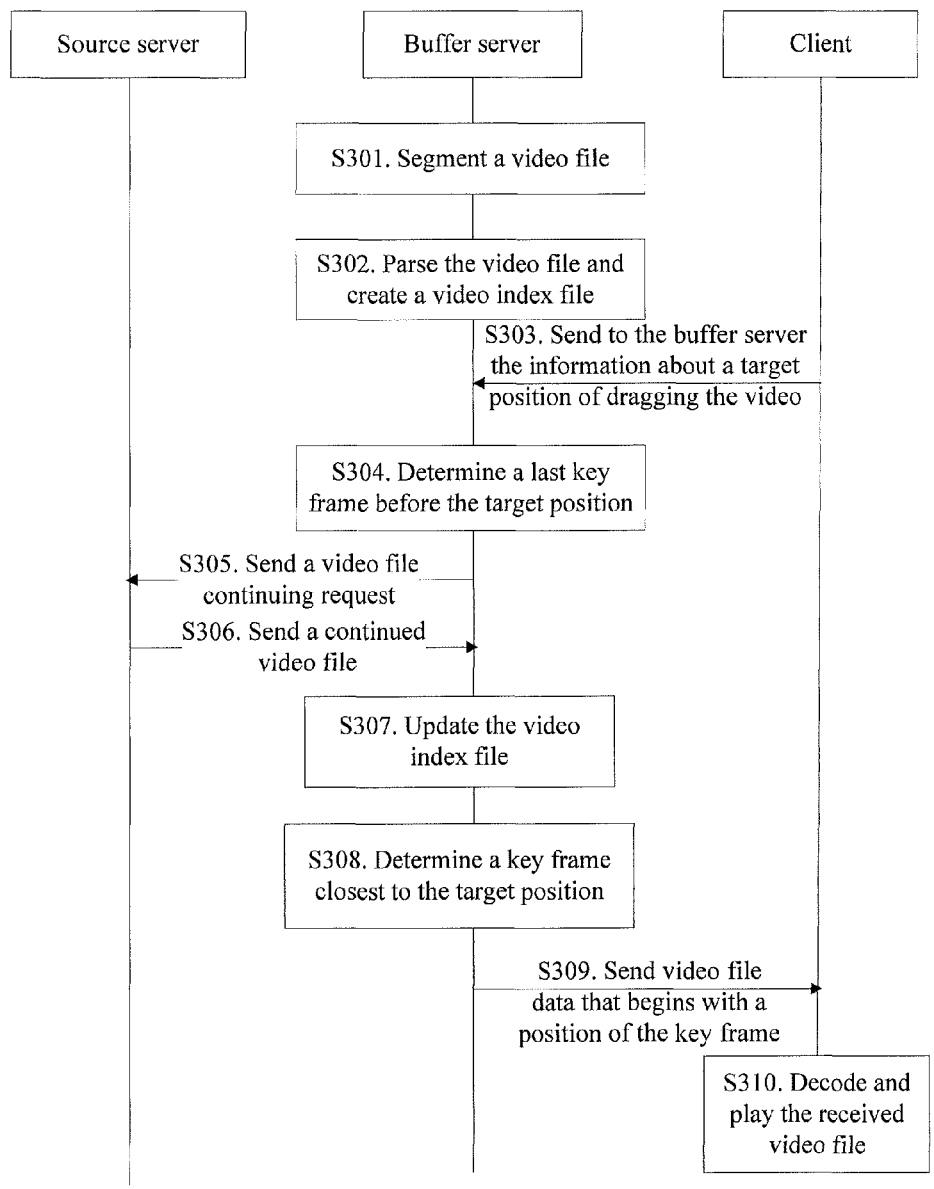
FIG. 3 is a flowchart of a method according to Embodiment 3 of the present invention.

As shown in FIG. 3, a buffer server processes a video in the following procedure:

S301. A buffer server performs segmentation for a video file sent by a source server.

The buffer server receives the video file sent by the source server, and divides the video file into segments of a fixed size. The buffer server sorts all video segments in order of a click-through rate, and determines popular video segments of high click-through rates and unpopular video segments of low click-through rates. On the premise of keeping receiving video files sent by the source server, the unpopular video segments of low click-through rates are dynamically deleted and the popular video segments are retained.

S302-S303 are the same as S202-S203.

S304. The buffer server determines a last key frame before the target position.

The buffer server detects that the video segment corresponding to the target position is not stored in the buffer server, that is, the dragging goes beyond a storage range of a server, and therefore, the buffer server calculates differences between the target position and the position of each key frame before the target position in a video index file, and determines a key frame with the least difference as the last key frame.

S305. The buffer server sends a video file continuing request to the source server.

It should be noted that, after determining the last key frame before the target position, the buffer server encapsulates information about the position of the key frame into the video file continuing request.

S306. The source server sends a continued video file to the buffer server.

The start position of the continued video file is the position of the key frame carried in the request message.

S307. The buffer server updates the video index file.

By traversing the received continued video file, the buffer server extracts the position of a key frame in the continued file, and writes the position of the key frame into the video index file to complete the process of updating the video index file dynamically.

S308-S310 are the same as S204-S206.

In this embodiment, a buffer server requests a source server to continue transferring a video file, updates a video index file dynamically, and, by searching the updated video index file, determines a key frame closest to a target position, and sends video file data that begins with a position of the key frame to a client, which solves the problem that a video without a file header and a video dragged beyond a storage range of a server cannot be played after being dragged, and improves user experience.

Embodiment 4 of the Present Invention

Figure 4:
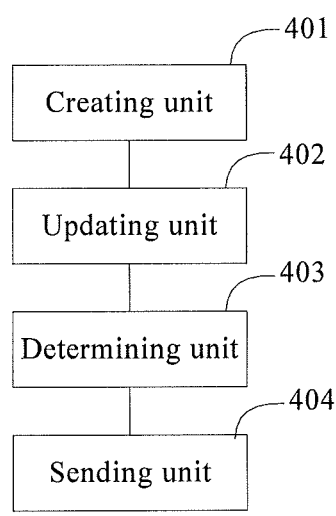
FIG. 4 is a structural block diagram of a buffer server according to Embodiment 4 of the present invention.

As shown in FIG. 4, the embodiment of the present invention provides a buffer server, including:

A creating unit 401 is configured to parse a video file, and create a video index file, where the index file includes a position of a key frame in the video file.

The creating unit 401 traverses the video file once to obtain a position of a key frame in a specific file data packet, creates a video index file, and writes information about the position of the key frame into the video index file.

An updating unit 402 is configured to: according to information about a target position of video dragging and sent by a client, update the index file created by the creating unit.

The updating unit 402 detects that the target position goes beyond the range of the locally stored video segment, and therefore, instructs the sending unit to send a video file continuing request to a source server. The request carries information about the position of a last key frame before the target position of dragging.

It should be noted that differences may be calculated between the position of each key frame before the target position in the index file and the target position, and a key frame with the least difference is obtained and used as the information about the position of the last key frame before the target position.

After receiving the request, the source server sends a continued video file to the updating unit 402, where the start position of the continued video file is the position information of the last key frame before the target position of dragging.

The updating unit 402 traverses the continued video file to obtain the position of the key frame in the continued video file, and writes the position of the key frame into the video index file to update the video index file.

A determining unit 403 is configured to determine a key frame closest to the target position according to the index file updated by the updating unit.

The determining unit 403 calculates differences between the position of each key frame in the index file updated by the updating unit and the target position of video dragging, and determines a key frame with the least absolute value of the difference, where the position of the key frame may be before the target position or after the target position.

A sending unit 404 is configured to send video file data that begins with a position of the closest key frame to the client so that the client starts playing from the target position.

In addition, the sending unit 404 further sends a video file continuing request to the source server.

Persons skilled in the art can clearly understand that, for the purpose of convenient and brief description, for a detailed working process of the foregoing devices and units, reference may be made to a corresponding process in the foregoing method embodiments, which is not repeated again herein.

In the buffer server provided in this embodiment, the processing unit creates and updates a video index file, and compares a recorded position of a key frame with a target position of video dragging to determine a key frame closest to the target position; and the sending unit sends video file data that begins with the position of the key frame to a client, thereby solving the problem that a video file without a file header and a video dragged beyond the storage range of the server cannot be played after being dragged, and improving user experience.

In the embodiments provided in this application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical or other forms.

In addition, functional units in the embodiments of the present invention may be integrated into one processing unit, or each of the units may exist alone physically, or two or more units are integrated into one unit. The integrated units may be implemented in a form of hardware, or may be implemented in a form of hardware plus a software functional unit.

The integrated unit implemented in a form of a software functional unit may be stored in a computer readable storage medium. The software functional unit is stored in a storage medium and includes several instructions for instructing a computer device (which may be a personal computer, a server, or a network device) to perform part of the steps of the methods in the embodiments of the present invention. The foregoing storage medium includes: any medium that can store program codes, such as a USB flash disk, a removable hard disk, a read-only memory (Read-Only Memory, ROM for short), a random access memory (Random Access Memory, RAM for short), a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as the modifications or replacements do not cause the essence of corresponding technical solutions to depart from the scope of the technical solutions of the embodiments of the present invention.

What is claimed is:

1. A video processing method, comprising:
   parsing, by a buffer server, a video file, and creating a video index file, wherein the index file comprises a position of a key frame in the video file;
   updating the index file according to information about a target position of video dragging and received from a client;
   determining a key frame closest to the target position according to the updated index file; and
   sending video file data that begins with a position of the closest key frame to the client so that the client starts playing from the target position.

2. The method according to claim 1, wherein: the creating, by the buffer server, a video index file, comprises:
   traversing the video file to obtain the position of the key frame; and
   creating the video index file and writing the position of the key frame into the video index file.

3. The method according to claim 1, wherein the updating the index file comprises:
   detecting, by the buffer server, that the target position goes beyond a range of the video file, and sending a video file continuing request to a source server; and
   traversing, by the buffer server, a continued video file sent by the source server to obtain a position of a key frame in the continued video file, and writing the position of the key frame in the continued video file into the video index file.

4. The method according to claim 3, wherein: before sending the video file continuing request to the source server, the method further comprises:
   calculating a difference between the position of the key frame before the target position and the target position, and determining a key frame with a least absolute value of the difference; and
   encapsulating a position of the key frame with the least absolute value of the difference into the request.

5. The method according to claim 1, wherein the position of the key frame comprises:
   a byte offset of the key frame, or a time offset of the key frame.

6. A buffer server for processing a video, comprising:
   a creating unit, configured to parse a video file, and create a video index file, wherein the index file comprises a position of a key frame in the video file;
   an updating unit, configured to: according to information about a target position of video dragging and sent by a client, update the index file created by the creating unit;
   a determining unit, configured to determine a key frame closest to the target position according to the index file updated by the updating unit; and
   a sending unit, configured to send video file data that begins with a position of the closest key frame to the client so that the client starts playing from the target position.

7. The buffer server according to claim 6, wherein: the creating, by the creating unit, a video index file, comprises:
   traversing the video file to obtain the position of the key frame; and
   creating the video index file and writing the position of the key frame into the video index file.

8. The buffer server according to claim 6, wherein: the updating, by the updating unit, the index file created by the creating unit, comprises:
   detecting, by the updating unit, that the target position goes beyond a range of the video file, and sending, by the sending unit, a video file continuing request to a source server; and
   traversing, by the updating unit, a continued video file sent by the source server to obtain a position of a key frame in the continued video file, and writing the position of the key frame in the continued video file into the video index file.

9. The buffer server according to claim 6, wherein the position of the key frame comprises:
   a byte offset of the key frame, or a time offset of the key frame.

10. An apparatus comprising:
    a buffer server for processing a video configured to parse a video file, and create a video index file, wherein the index file comprises a position of a key frame in the video file, configured to: according to information about a target position of video dragging and sent by a client, update the created index file, configured to determine a key frame closest to the target position according to the updated index file, and configured to send video file data that begins with a position of the closest key frame to the client so that the client starts playing from the target position.

* * * * *